(12) United States Patent
Shimizu et al.

(10) Patent No.: US 9,546,240 B2
(45) Date of Patent: Jan. 17, 2017

(54) METHOD FOR PRODUCING POLYMER

(71) Applicant: Asahi Kasei Chemicals Corporation, Tokyo (JP)

(72) Inventors: Daisuke Shimizu, Tokyo (JP); Kenta Shibuya, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/395,987

(22) PCT Filed: Apr. 24, 2013

(86) PCT No.: PCT/JP2013/062099
§ 371 (c)(1),
(2) Date: Oct. 21, 2014

(87) PCT Pub. No.: WO2013/161890
PCT Pub. Date: Oct. 31, 2013

(65) Prior Publication Data
US 2015/0112027 A1    Apr. 23, 2015

(30) Foreign Application Priority Data

Apr. 26, 2012 (JP) ................................ 2012-101314
Apr. 26, 2012 (JP) ................................ 2012-101315

(51) Int. Cl.
| | | |
|---|---|---|
| C08F 293/00 | (2006.01) | |
| C08C 2/04 | (2006.01) | |
| C08F 6/02 | (2006.01) | |
| C08C 19/02 | (2006.01) | |
| C08F 8/04 | (2006.01) | |

(52) U.S. Cl.
CPC ............... *C08F 293/00* (2013.01); *C08C 2/04* (2013.01); *C08C 19/02* (2013.01); *C08F 6/02* (2013.01); *C08F 8/04* (2013.01); *C08F 2800/20* (2013.01)

(58) Field of Classification Search
CPC .............. C08C 2/04; C08C 19/02; C08F 6/02; C08F 8/04; C08F 293/00
See application file for complete search history.

(56) References Cited

U.S. PATENT DOCUMENTS

| | | |
|---|---|---|
| 3,780,138 A | 12/1973 | Hassell et al. |
| 4,595,749 A | 6/1986 | Hoxmeier |
| 5,104,972 A | 4/1992 | Madgavkar et al. |
| 5,767,207 A | 6/1998 | Wilkey et al. |
| 5,886,108 A | 3/1999 | Miyamoto et al. |
| 6,100,339 A | 8/2000 | Watanabe et al. |
| 2002/0009149 A1 | 1/2002 | Rodriguez et al. |
| 2002/0099149 A1 | 7/2002 | Ko et al. |

FOREIGN PATENT DOCUMENTS

| | | |
|---|---|---|
| EP | 0781784 A1 | 7/1997 |
| EP | 2048164 A2 | 4/2009 |
| JP | H06-136034 A | 5/1994 |
| JP | H07-64889 B | 7/1995 |
| JP | H09-100314 A | 4/1997 |
| JP | H11-071426 A | 3/1999 |
| JP | 2002-167406 A | 6/2002 |
| JP | 2002-356509 A | 12/2002 |
| JP | 2009-091574 A | 4/2009 |
| WO | 00/08069 A1 | 2/2000 |

OTHER PUBLICATIONS

International Preliminary Report on Patentability issued in corresponding International Patent Application No. PCT/JP2013/062099 dated Oct. 28, 2014.
European Search Report issued in related European Patent Application No. 13782285.4 dated Mar. 17, 2015.
International Search Report issued in corresponding International Patent Application No. PCT/JP2013/062099 dated May 28, 2013.

*Primary Examiner* — Irina S Zemel
*Assistant Examiner* — Jeffrey Lenihan
(74) *Attorney, Agent, or Firm* — Morgan, Lewis & Bockius LLP

(57) ABSTRACT

The present invention is related to a method for producing a polymer to efficiently remove metal residues of at least lithium and/or titanium from a polymer solution comprising the at least lithium and/or titanium to thereby obtain a refined polymer solution having little metal residue.

18 Claims, No Drawings

METHOD FOR PRODUCING POLYMER

TECHNICAL FIELD

The present invention relates to a method for producing a polymer.

BACKGROUND ART

In recent years, there have been much used in the broad field thermoplastic elastomers which are soft materials having a rubber elasticity, need no vulcanization process, and allow molding processing and recycling like thermoplastic resins.

For example, polymers of a conjugated diene monomer such as 1,3-butadiene and isoprene, or copolymers of a conjugated diene monomer with a vinyl aromatic monomer such as styrene copolymerizable with the conjugated diene monomer are very important as modifiers for impact-resistant transparent resins or polyolefins and polystyrene resins.

Hydrogenated polymers obtained by adding hydrogen to olefinic double bond moieties contained in the conjugated dienic polymers have a feature of being excellent in weather resistance. The hydrogenated polymers make the most of the feature and are used for automobile parts, household appliance parts, electric wire coverings, medical parts, sundries, footwear and the like.

The conjugated dienic polymer is generally produced by a living anionic polymerization using an alkyllithium or the like as an initiator. Further in the case of providing a hydrogenated polymer, after the polymerization, a hydrogenation reaction is carried out on olefinic double bond moieties by using a periodic table group VIII or IV metal as a catalyst.

Various methods for hydrogenating a polymer having olefinic double bonds are reported, and for example, a hydrogenation method is known which uses a catalyst of a combination of a compound of a periodic table group VIII metal, particularly nickel or cobalt, with a suitable reducing agent such as an alkylaluminum compound. Besides, a method for hydrogenating unsaturated double bonds of conjugated dienic polymers is known which uses a catalyst of a combination of a compound of titanium, which is a periodic table group IV metal, for example, a bis(cyclopentadienyl)titanium compound, with a suitable reducing agent such as an alkylaluminum compound.

As described above, thermoplastic elastomers, particularly conjugated dienic polymers and hydrogenated polymers thereof as described above, come to contain metal residues originated from a polymerization initiator and a hydrogenation catalyst. Since the metal residues in a polymer solution lead to decreases in various qualities including humps, rough surface, coloring and turbidity of products, the metal residues need to be removed efficiently in the production process.

Then, some methods of removing metal residues remaining in a polymer solution are proposed. For example, Patent Literature 1 discloses a method of removing a lithium residue in a polymer solution by vigorously mixing the polymer solution and water by using a rotary dispersing machine having a meshing structure.

Patent Literature 2 discloses a method of removing a residue of a periodic table group VIII metal including nickel by using an oxidizing agent and a dicarboxylic acid. Further Patent Literature 3 discloses a method of adsorbing in a silicate salt. Other than the above, the removal of lithium and periodic table group VIII metals has been disclosed hitherto in a large number of prior literatures.

On the other hand, almost no report has been made so far on a method of removing a titanium residue. For example, a technology of removing titanium and lithium residues by using an inorganic acid, an alcohol and water is disclosed in Patent Literature 4. Barely Patent Literature 5 discloses removing titanium and lithium residues by using an organic acid, an alcohol and water.

CITATION LIST

Patent Literature

Patent Literature 1: Japanese Patent Laid-Open No. 6-136034
Patent Literature 2: U.S. Pat. No. 4,595,749
Patent Literature 3: U.S. Pat. No. 5,104,972
Patent Literature 4: Japanese Patent Laid-Open No. 2002-167406
Patent Literature 5: Japanese Patent Laid-Open No. 2009-91574

SUMMARY OF INVENTION

Technical Problem

Each metal residue species in a product, such as lithium, titanium and nickel, causes bad effects including color tone and turbidity of the product and filter plugging. Therefore, the metal residues need to be effectively removed from a polymer solution. However, almost no report has been made in conventional technologies as described above, on technologies of effectively removing plural kinds of metal residues from a polymer solution comprising titanium, particularly on a removal method showing a high effect on titanium and lithium. Although Patent Literatures 4 and 5 disclose technologies of removing titanium and lithium, large amounts of an alcohol and water need to be used in metal removal, posing a large problem with the waste liquid treatment in industrial productions.

Even if the alcohol and water are to be reutilized, a large-scale refining facility is needed. Further in the metal removal process, there also arises a problem with the productivity including needing a long time for separation of the polymer solution and the alcohol.

The present invention has been achieved in consideration of the problem in the above-mentioned conventional technologies, and has an object to provide a method for producing a polymer, which can efficiently remove residues of metals comprising at least lithium and/or titanium from a polymer solution comprising the at least lithium and/or titanium to thereby obtain a refined polymer solution having little metal residue.

Solution to Problem

As a result of exhaustive studies to solve the above-mentioned problems, the present inventors have found that by mixing an acid compound having a specific chemical structure and water in a polymer solution comprising at least lithium and/or titanium, metal residues in the polymer solution can be removed efficiently in a short time; and this finding has led to the completion of the present invention.

That is, the present invention is as follows.

[1]

A method for producing a polymer, comprising:

step 1 of preparing a polymer solution comprising at least lithium and/or titanium;

step 2 of adding and mixing water in a volume 0.1 to 20 times a volume of the polymer solution and an acid compound selected from compounds represented by the following formula (1) to the polymer solution to thereby obtain a mixed liquid; and step 3 of removing a water phase from the mixed liquid to thereby obtain a refined polymer solution:

[Formula 1]

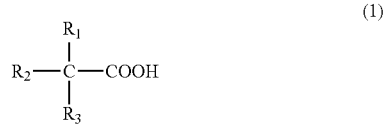

(1)

wherein $R_1$, $R_2$ and $R_3$ are each independently a substituent constituted of elements selected from C, H, O and N, and wherein the acid compound comprises 4 or more oxygen atoms in the molecule.

[2]

The method for producing the polymer according to the above-described [1], wherein the polymer solution comprises at least titanium.

[3]

The method for producing the polymer according to the above-described [1] or [2], wherein the acid compound has number of a hydroxyl group (provided that —OH of a carboxyl group is excluded) of 0 or 1.

[4]

The method for producing the polymer according to any one of the above-described [1] to [3], wherein the polymer solution further comprises aluminum.

[5]

The method for producing the polymer according to any one of the above-described [1] to [4], wherein the acid compound has a total number of oxygen atoms of 5 or more.

[6]

The method for producing the polymer according to any one of the above-described [1] to [5], wherein the acid compound has a total number of oxygen atoms of 7 or more.

[7]

The method for producing the polymer according to any one of the above-described [1] to [6], wherein the acid compound has a total number of carbon atoms of 20 or less.

[8]

The method for producing the polymer according to any one of the above-described [1] to [7], wherein the acid compound is a polyvalent carboxylic acid.

[9]

The method for producing the polymer according to any one of the above-described [1] to [8], wherein the acid compound comprises 3 or more carboxyl groups.

[10]

The method for producing the polymer according to any one of the above-described [1] to [9], wherein in the step 2, an oxidizing agent is further added and mixed.

[11]

The method for producing the polymer according to the above-described [10], wherein the oxidizing agent is hydrogen peroxide.

[12]

The method for producing the polymer according to any one of the above-described [1] to [11], wherein $R_1$, $R_2$ and $R_3$ in the formula (1) are a substituent constituted of an element selected from C, H and O.

[13]

The method for producing the polymer according to any one of the above-described [1] to [12], wherein in the step 2, the mixing is carried out by using a rotary dispersing machine having a meshing structure.

[14]

The method for producing the polymer according to any one of the above-described [1] to [13], wherein in the step 3, the water phase comprises lithium and/or titanium.

[15]

The method for producing the polymer according to any one of the above-described [1] to [14], wherein in the step 2, the mixed liquid has an alcohol concentration of 500 ppm or less.

Advantageous Effects of Invention

The present invention can provide a method for producing a polymer, the method efficiently removing a lithium and/or titanium residue remaining in a polymer solution by mixing the polymer solution, an acid compound having a specific structure and water, to be thereby able to provide a refined polymer solution having little metal residue.

DESCRIPTION OF EMBODIMENTS

Hereinafter, an embodiment to practice the present invention (hereinafter, referred to as "the present embodiment") will be described in detail. The present invention is not limited to the following embodiment, and various variants and modifications may be made within the gist.

[Method for Producing a Polymer]

A method for producing a polymer according to the present embodiment comprises:

step 1 of preparing a polymer solution comprising at least lithium and/or titanium;

step 2 of adding and mixing water in a volume 0.1 to 20 times the volume of the polymer solution and an acid compound represented by the following formula (1) to the polymer solution to thereby obtain a mixed liquid; and step 3 of removing a water phase from the mixed liquid to thereby obtain a refined polymer solution:

[Formula 2]

(1)

wherein $R_1$, $R_2$ and $R_3$ are each independently a substituent constituted of elements selected from C, H, O and N, and $R_1$, $R_2$ and $R_3$ may be identical or different, and wherein the acid compound represented by the above formula comprises at least 4 or more oxygen atoms in the molecule.

Hereinafter, the each step will be described in detail.

[Step 1]

In the method for producing a polymer according to the present embodiment, step 1 is a step of preparing a polymer solution comprising at least lithium and/or titanium.

(A Polymer Solution Comprising Lithium and/or Titanium)

A polymer solution to be refined in the present embodiment comprises at least lithium or titanium or the both, and may further contain aluminum. A method for preparing the polymer solution is not especially limited, but includes, for example, a method of subjecting a conjugated dienic polymer polymerized using a lithium-based polymerization initiator to a hydrogenation reaction in the presence of a catalyst composed of a titanium compound and various types of reducing agents to thereby prepare a hydrogenated conjugated dienic copolymer solution. In the present embodiment, as a polymer solution to be refined, a conjugated dienic polymer solution before the hydrogenation reaction may be prepared.

A solvent of the polymer solution to be used in the present embodiment is preferably a solvent which can be separated from a water phase when water is added, and is an inactive solvent not reacting with any reaction product in the polymerization reaction and the hydrogenation reaction; specific examples thereof include aliphatic hydrocarbons such as n-pentane, n-hexane, n-heptane and n-octane; alicyclic hydrocarbons such as cyclopentane, cyclohexane and cycloheptane; and ethers such as diethyl ether and tetrahydrofuran; and the solvent is selected from these and can be used singly or as a mixture thereof.

The conjugated dienic polymer is not especially limited as long as being a conjugated dienic polymer used usually in the field concerned, but specifically usable are a conjugated diene homopolymer having a weight-average molecular weight of 500 to 1,000,000, a random, taper or block copolymer of a conjugated diene monomer and a vinyl aromatic monomer, or the like. Copolymers obtained by hydrogenating unsaturated double bonds of these conjugate diene units can also be used.

The weight-average molecular weight can be determined in terms of polystyrene by using gel permeation chromatography (GPC).

The usable conjugated diene monomer is not especially limited, but specifically usable are conjugated dienic compounds having 4 to 12 carbon atoms, such as 1,3-butadiene, isoprene, piperylene, phenylbutadiene, 3,4-dimethyl-1,3-hexadiene and 4,5-diethyl-1,3-octadiene; among these, 1,3-butadiene and isoprene are preferably used. The vinyl aromatic monomer copolymerizable with the conjugated diene monomer is not especially limited, but specifically usable are vinylaryl compounds such as styrene, α-methylstyrene, a styrene substituted with an alkoxy group, 2-vinylpyridine, 4-vinylpyridine, a vinylnaphthalene and a vinylnaphthalene substituted with an alkyl group. Among these, styrene and α-methylstyrene are preferably used.

The mass ratio of a conjugated diene monomer to a vinyl aromatic monomer in the case where a copolymer is produced by mixing the conjugated diene monomer and the vinyl aromatic monomer is not especially limited, but is preferably 5:95 to 95:5. If the amount of a conjugated diene monomer used is 5 or more in mass ratio, the copolymer is good in impact resistance, and allows being used in various applications. By contrast if the amount of a conjugated diene monomer used is 95 or less in mass ratio, the product processability becomes good. Therefore, the above range is preferably maintained.

Such a conjugated dienic polymer can be produced by a polymerization method usually used in the field concerned. In the present embodiment, for example, an anionic polymerization utilizing an organolithium compound as an initiator can be carried out. The organolithium compound is not especially limited, but specifically usable are n-butyllithium, s-butyllithium and the like. The amount of such an initiator used is an amount used usually in the field concerned, and can optionally be regulated depending on the molecular weight of a target polymer.

(Hydrogenation Reaction)

The obtained polymer is thereafter subjected to a hydrogenation reaction to be thereby able to produce a hydrogenated conjugated dienic polymer.

The titanium compound used in the hydrogenation reaction is not especially limited as long as being a titanium compound used usually in the field concerned, but specifically includes cyclopentadienyltitanium compounds; these can be used singly or as a mixture thereof, for example, among cyclopentadienyltitanium halide, cyclopentadienyl (alkoxy)titanium dihalide, bis(cyclopentadienyl)titanium dihalide, bis(cyclopentadienyl)titanium dialkyl compounds, bis(cyclopentadienyl)titanium diaryl compounds and bis(cyclopentadienyl)titanium dialkoxy compounds.

The titanium compound is used preferably in 0.01 to 20 mmol, and more preferably in 0.05 to 5 mmol, per 100 g of a conjugated dienic polymer. If the amount of a titanium compound used as the catalyst is 0.01 mmol or more, the hydrogenation reaction efficiently progresses to thereby make the productivity excellent. If the amount used is 20 mmol or less, the amount is a sufficient amount of the catalyst added to thereby make the economic efficiency good and further suppress use of a chemical substance in an excessive amount to remove the catalyst after the reaction. Therefore, the above range is preferably maintained.

The reducing agent usable together with the titanium compound is not especially limited as long as being a reducing agent used usually in the field concerned, but specifically includes alkylaluminum compounds, alkylmagnesium compounds, organolithium compounds and metal hydrides; and these can be used singly or in combinations of two or more.

The hydrogenation reaction using the titanium-based catalyst is not especially limited, but can be carried out specifically using methods described in International Patent Application No. 00/08069, and U.S. Pat. Nos. 4,501,857, 4,673,714, 4,980,421, 5,753,778, 5,910,566, and 6,020,439, and the like.

The hydrogenation reaction can be carried out in an inactive solvent. Here, an inactive solvent means a solvent not reacting with any reaction product in the polymerization reaction and the hydrogenation reaction, and is not especially limited, but specifically includes aliphatic hydrocarbons such as n-pentane, n-hexane, n-heptane and n-octane; alicyclic hydrocarbons such as cyclopentane, cyclohexane and cycloheptane; and ethers such as diethyl ether and tetrahydrofuran; and the solvent is selected from these and can be used singly or as a mixture thereof.

The polymer concentration in the polymer solution in step 1 is not especially limited, but is preferably 5 to 50% by mass, and more preferably 10 to 25% by mass. If the polymer concentration is in the above range, the viscosity of the polymer solution can be adjusted so as to be easily handleable and the productivity is made to be good, which is therefore preferable.

On the other hand, the hydrogenation reaction is carried out preferably by maintaining the polymer solution at a constant temperature under an inert gas atmosphere of hydrogen, helium, argon, nitrogen or the like, thereafter adding a hydrogenation catalyst in a stirring state or no stirring state, and injecting hydrogen gas at a constant pressure. The hydrogenation reaction is carried out preferably at a temperature in the range of 30 to 150° C. and a pressure in the range of 2 to 30 kg/cm².

If the temperature of the hydrogenation reaction is in the above range, the reactivity is improved to be thereby able to provide a sufficient reaction yield, and side reactions due to the thermal degradation of the polymer can be suppressed. If the pressure of the hydrogenation reaction is in the above range, the reaction speed is improved to thereby shorten the reaction time, and the expense to invest in a reactor can be suppressed, which is economically preferable.

Hereinafter, step 2 and step 3 will be described, which are steps of removing a remaining lithium residue and titanium residue from the polymer solution, for example, a conjugated dienic polymer solution in which the hydrogenation reaction has been completed as described above.

[Step 2]

In the method for producing a polymer according to the present embodiment, step 2 is a step of adding and mixing water and an acid compound represented by the following formula (1) to the polymer solution obtained in step 1, for example, a hydrogenated conjugated dienic polymer solution, to thereby obtain a mixed liquid.

(Amount of Water Added)

In the present embodiment, the volume of water added is 0.1 to 20 times the volume of the polymer solution. The volume added is preferably 0.2 to 10 times, and more preferably 0.5 to 5 times. If the volume of water added is in the above range, a lithium residue and a titanium residue contained in the polymer solution are easily removed, and the drain water volume can be reduced.

(Acid Compound)

Further in the present embodiment, an acid compound represented by the following formula (1) is added together with water.

[Formula 3]

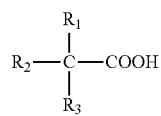

(1)

In the above formula (1), $R_1$, $R_2$ and $R_3$ are each independently a substituent constituted of elements selected from C, H, O and N, and are preferably each independently a substituent constituted of elements selected from C, H and O. By making $R_1$, $R_2$ and $R_3$ to be such substituents, the environmental pollution due to drain water can be reduced.

It is preferable from the viewpoint of the removal effect of a lithium residue and a titanium residue that the acid compound represented by the formula (1) has 2 or more carboxyl groups in the molecule, and comprises at least 4 or more oxygen atoms.

The number of hydroxyl groups (provided that the —OH group of the carboxyl group is excluded) in the acid compound is not especially limited, but is preferably 0 or 1. By making the number of hydroxyl groups in the acid compound to be in the above range, the removal efficiency of the lithium residue and the titanium residue is raised and the acid compound hardly remains in the polymer solution, which is therefore preferable.

The total number of oxygen atoms contained in the acid compound is preferably 4 or more, more preferably 5 or more, and still more preferably 7 or more. By making the total number of oxygen atoms to be in the above range, the removal efficiency of the lithium residue and the titanium residue is raised, and the acid compound hardly remains in the polymer solution, which is therefore preferable.

Further, the total number of carbon atoms contained in the acid compound is preferably 20 or less, more preferably 3 to 10, and still more preferably 6 to 8. By making the total number of carbon atoms to be in the above range, the removal efficiency of the lithium residue and the titanium residue is raised, and the acid compound hardly remains in the polymer solution, which is therefore preferable.

In the present embodiment, the acid compound is not especially limited as long as being an acid compound represented by the above formula, but from the viewpoint of the removal effect of the lithium residue and the titanium residue, α-hydroxycarboxylic acid derivatives, polyvalent carboxylic acids having 2 or more carboxyl groups and polyvalent carboxylic acid derivatives can suitably be used; and among these, acid compounds having 3 or more carboxyl groups in the molecule are preferable. By making the acid compound have 3 or more carboxyl groups, a refined polymer solution having little metal residue and being excellent in the color tone can be provided.

Specific examples of the acid compound are not especially limited, but include malonic acid, hydroxymalonic acid, succinic acid, malic acid, citric acid, isocitric acid, glutaric acid, adipic acid, aconitic acid, 1,2,3-propanetricarboxylic acid and 1,2,3,4-butanetetracarboxylic acid. An acid compound further comprising nitrogen in the molecule includes various types of amino acid derivatives, and for example, ethylenediaminetetraacetic acid can be used.

(Amount of the Acid Compound Blended)

The acid compound is used in a molar number preferably 0.1 to 50 times, more preferably 0.25 to 20 times, and still more preferably 0.5 to 10 times, with respect to the total molar number of metal atoms including lithium atoms and titanium atoms contained in the polymer solution. The use of the acid compound in the above range can effectively remove the lithium residue and the titanium residue, and further reduce the remaining of the acid compound in the polymer solution.

(Addition Method)

A method of adding the acid compound is not especially limited, and specifically includes a method in which water and the acid compound are mixed in advance to thereby make an aqueous solution, and the aqueous solution is added to the polymer solution, and a method in which after the polymer solution and water are mixed, the acid compound is added. Among these, from the viewpoint of simplification of the process, the method of adding an aqueous solution of water and the acid compound to the polymer solution is preferable. In this case, the concentration and the volume of the aqueous solution of the acid compound are not especially limited, but it is preferable that the total volume of a water phase after the polymer solution, water and the acid compound aqueous solution are mixed is so adjusted as to be in the range of 0.1 to 20 times the volume of the polymer solution.

(Mixing Method)

In step 2, a method of mixing the polymer solution, water and the acid compound is not especially limited, and may involve mechanical mixing using, for example, a motionless mixing machine having no driving section such as a static mixer and a storage tank equipped with a stirring blade. Above all, it is preferable that the mixing is carried out under the following condition by using a rotary dispersing machine having a meshing structure as described in Japanese Patent Laid-Open No. 6-136034. The lithium residue and the titanium residue can thereby be removed effectively from the polymer solution.

That is, in the operation of the rotary dispersing machine, the P/V value is made to be preferably $3 \times 10^4$ (kW/m$^3$) or more, more preferably $5 \times 10^4$ (kW/m$^3$), and still more preferably $1 \times 10^5$ (kW/m$^3$). Thereby, a powerful shearing force can be imparted and metal residues can more effectively be removed from the polymer solution. Here, P (kW) is a power of the rotary dispersing machine, and can easily be determined by measuring an electric power consumption at the time of mixing. V (m$^3$) is a space volume of the mixing section in the rotary dispersing machine, and is a space volume of the section where the shearing force is imparted to a solution. The peripheral velocity (2πr·n) is made to be preferably 5 (m/s) or more, more preferably 7 (m/s), and still more preferably 10 (m/s). Here, r (m) is a radius of the outermost teeth of the rotor in the rotary dispersing machine; and n (s$^{-1}$) is a rotation frequency of the rotor in the rotary dispersing machine. By carrying out the mixing of the polymer solution and water by the rotary dispersing machine under the above condition, the metal residues originated from the catalyst contained in the polymer solution can easily be removed in a short average staying time of 0.01 to 10 (s). Other than the above, there may be used, for example, a method in which a shearing force is applied by a homogenizer including a stirring machine or an emulsifying machine, a pump, or the like, or a method in which a colliding force and a frictional force are applied by a mill such as a ball mill or a rod mill, or a high-pressure crushing roll or the like.

(Oxidizing Agent)

In the present embodiment, in step 2, an oxidizing agent can further be added to the polymer solution. The addition of the oxidizing agent can promote the dissolution of the lithium residue and the titanium residue in the water phase. The oxidizing agent is not especially limited, but includes hydrogen peroxide, organic peroxides and ozone. A method of using hydrogen peroxide is not especially limited, but even the addition of a small amount of an about 30% aqueous solution thereof exhibits the effect. The use of hydrogen peroxide can remove metal residues in a short time and efficiently.

The organic peroxides are not especially limited as long as being organic peroxides usually used in the field concerned, but specifically include dicumyl peroxide, di-tert-butyl peroxide, 2,5-dimethyl-2,5-di-(tert-butylperoxy) hexane, 2,5-dimethyl-2,5-di-(tert-butylperoxy)hexyne-3,1, 3-bis(tert-butylperoxyisopropyl)benzene, 1,1-bis(tert-butylperoxy)-3,3,5-trimethylcyclohexane, n-butyl-4,4-bis (tert-butylperoxy)valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide and tert-butyl cumyl peroxide. A method of using ozone is not especially limited, but can involve using a usual ozone generating apparatus, including, for example, a silent discharge apparatus.

The amount in mol of these oxidizing agents used is preferably 0.1 to 100 times, more preferably 0.5 to 75 times, and still more preferably 1.0 to 50 times, with respect to the total molar number of metal atoms such as lithium atoms and titanium atoms remaining in the polymer solution. Making the amount of the oxidizing agent added to be in the above range, the removal efficiency of the lithium residue and the titanium residue can be improved and the remaining of the oxidizing agent in the polymer solution can further be suppressed.

In step 2, it is preferable that no alcohol is added to the polymer solution. Specifically, the alcohol concentration in the mixed liquid in step 2 is preferably 500 ppm or less. An excellent metal removal process can thereby be provided which well separates the polymer solution and the water phase, can remove metals in a short time, and is easy in the waste liquid treatment. An alcohol mentioned herein includes methanol, ethanol, propanol, isopropanol, butanol and 2-ethyl-1-hexanol. Particularly no addition of an alcohol comprising no carboxyl group is preferable.

[Step 3]

In the method for producing a polymer according to the present embodiment, step 3 is a step of removing (separating) a water phase from the mixed liquid to thereby obtain a refined polymer solution. A method of separating water in step 3 is not especially limited as long as being a method usually used in the field concerned, but includes, for example, a method of removing the water phase from the mixed liquid composed of the polymer solution and the water phase by still standing separation, centrifugal separation, counterflow extraction or the like.

The water phase preferably comprises lithium and/or titanium. Metal residues can thereby easily be removed from the polymer solution. Here, the amount of metals contained in the water phase can be determined by the elemental analysis using the inductively coupled plasma (ICP).

(Refined Polymer Solution)

Since metal residues contained in the polymer solution migrate to the water phase, the refined polymer solution obtained in step 3 is a polymer solution in which the metal residues have been more removed than in a polymer solution prepared in step 1.

EXAMPLES

Hereinafter, the present invention will be described in detail by way of Examples, but the present invention is not limited thereto.

Production Example 1

A cyclohexane solution of a polystyrene-polybutadiene-polystyrene block copolymer (styrene content: 30.0% by mass, butadiene content: 70.0% by mass, number-average molecular weight: 50,000) was obtained by a conventionally well-known anionic polymerization method using an alkyllithium as an initiator. The obtained polymer solution was vacuum dried; and the amount of metals contained in the solid polymer was measured by an elemental analysis using an inductively coupled plasma (ICP) (made by SHIMADZU CORPORATION, ICPS-7510; hereinafter, the same), which revealed that the amount of a Li residue was 100 ppm.

Production Example 2

2800 g of the cyclohexan solution comprising 400 g of the polystyrene-polybutadiene-polystyrene block copolymer obtained in Production Example 1 was charged in a 5-L autoclave reactor, and heated to 60° C. under stirring at 400 rpm. Thereafter, 1.5 mmol of triethylaluminum and 0.8 mmol of bis(cyclopentadienyl)titanium dichloride were added, and the mixture was pressurized by hydrogen of 10 kg/cm$^2$ to be subjected to a hydrogenation reaction to thereby obtain a hydrogenated polymer solution. As a result of an analysis by NMR of the hydrogenated polymer in such a way, it was confirmed that 98% or more of double bonds in the polybutadiene block had been hydrogenated. The amount of metals contained in the obtained polymer solution was measured by the elemental analysis using the inductively coupled plasma (ICP), which revealed that a Ti residue was 102 ppm; a Li residue was 100 ppm; and an Al residue was 101 ppm.

Example 1

The polymer solution obtained in Production Example 1, water in a volume two times the volume of the polymer solution, and succinic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 2

The polymer solution obtained in Production Example 1, water in a volume two times the volume of the polymer solution, and malic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 3

The polymer solution obtained in Production Example 2, water in a volume two times the volume of the polymer solution, and succinic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 4

The polymer solution obtained in Production Example 2, water in a volume two times the volume of the polymer solution, and malic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 5

The polymer solution obtained in Production Example 2, water in a volume two times the volume of the polymer solution, and ethylenediaminetetraacetic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 6

The polymer solution obtained in Production Example 2, water in a volume two times the volume of the polymer solution, and 1,2,3-propanetricarboxylic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 7

The polymer solution obtained in Production Example 2, water in a volume two times the volume of the polymer solution, and citric acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 8

The polymer solution obtained in Production Example 2, water in a volume two times the volume of the polymer solution, and succinic acid in mole two times the total molar amount of the metal atoms were mixed by a rotary dispersing machine having a meshing structure (made by NIKKO KOGYO CO., LTD., Cavitron 1010) under the condition of 60° C. and 7600 rpm for 0.1 (s) to thereby obtain a mixed liquid. The P/V value at this time was $3 \times 10^4$ (kW/m$^3$) and the peripheral velocity was 28 (m/s). Thereafter, the obtained mixed liquid was fed to a tank heated at 60° C., made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 9

The polymer solution obtained in Production Example 2, water in a volume two times the volume of the polymer solution, and malic acid in mole two times the total molar amount of the metal atoms were mixed by a rotary dispersing machine having a meshing structure (made by NIKKO KOGYO CO., LTD., Cavitron 1010) under the condition of 60° C. and 7600 rpm for 0.1 (s) to thereby obtain a mixed liquid. The P/V value at this time was $3 \times 10^4$ (kW/m$^3$) and the peripheral velocity was 28 (m/s). Thereafter, the obtained mixed liquid was fed to a tank heated at 60° C., made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 10

The polymer solution obtained in Production Example 2, a 30% hydrogen peroxide aqueous solution in a volume two times the volume of the polymer solution, and succinic acid in mole two times the total molar amount of titanium atoms were charged in a mixer equipped with a stirrer, and vigorously stirred at 60° C. for 10 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 11

The polymer solution obtained in Production Example 2, a 30% hydrogen peroxide aqueous solution in a volume two times the volume of the polymer solution, and 1,2,3,4-butanetetracarboxylic acid in mole two times the total molar amount of titanium atoms were charged in a mixer equipped with a stirrer, and vigorously stirred at 60° C. for 10 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Example 12

The polymer solution obtained in Production Example 2, a 30% hydrogen peroxide aqueous solution in a volume two times the volume of the polymer solution, and ethylenediaminetetraacetic acid in mole two times the total molar amount of titanium atoms were charged in a mixer equipped with a stirrer, and vigorously stirred at 60° C. for 10 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Comparative Example 1

The polymer solution obtained in Production Example 2, water in a volume two times the volume of the polymer solution, and oxalic acid in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Comparative Example 2

The polymer solution obtained in Production Example 2, water in a volume two times the volume of the polymer solution, and lactic acid in mole two times the total molar amount of the metal atoms were mixed by a rotary dispersing machine having a meshing structure (made by NIKKO KOGYO CO., LTD., Cavitron 1010) under the condition of 60° C. and 7600 rpm for 0.1 (s) to thereby obtain a mixed liquid. The P/V value at this time was $3 \times 10^4$ (kW/m$^3$) and the peripheral velocity was 28 (m/s). Thereafter, the obtained mixed liquid was fed to a tank heated at 60° C., made to stay for 5 min to thereby separate a polymer solution phase and a water phase. The separation state was good. After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

Comparative Example 3

The polymer solution obtained in Production Example 2, isopropanol in a volume two times the volume of the polymer solution, and glycolic acid in mole two times the total molar amount of the metal atoms were mixed by a rotary dispersing machine having a meshing structure (made by NIKKO KOGYO CO., LTD., Cavitron 1010) under the condition of 60° C. and 7600 rpm for 0.1 (s) to thereby obtain a mixed liquid. The P/V value at this time was $25 \times 10^4$ (kW/m$^3$) and the peripheral velocity was 28 (m/s). Thereafter, the obtained mixed liquid was fed to a tank heated at 60° C., and made to stay for 5 min to attempt to separate the polymer solution phase and the water phase, but the mixed liquid was in an emulsion state and could not be separated.

Comparative Example 4

The polymer solution obtained in Production Example 2, water in a volume two times the volume of the polymer solution, and bis(2-ethylhexyl) hydrogenphosphate in mole two times the total molar amount of the metal atoms were charged in a mixer equipped with a stirrer, and vigorously stirred at 60° C. for 15 min; thereafter, the mixture was made to stay for 5 min to thereby separate a polymer solution phase and a water phase. The separation state was good.

After the water phase was removed, the polymer solution was vacuum dried to thereby obtain a solid polymer. The amount of metals contained in the obtained solid polymer was measured by the elemental analysis using the inductively coupled plasma (ICP). The measurement result is shown in Table 1.

TABLE 1

| | | | | | Metal Amount | | |
| --- | --- | --- | --- | --- | --- | --- | --- |
| | Mixing Condition | Water | Oxidizing Agent | Acid Compound | Li amount (ppm) | Ti amount (ppm) | Al amount (ppm) |
| Production Example 1 | — | — | — | — | 100 | — | — |
| Example 1 | mixer equipped with a stirrer | 2 | — | succinic acid | 32 | — | — |
| Example 2 | mixer equipped with a stirrer | 2 | — | malic aicd | 18 | — | — |
| Production Example 2 | — | — | — | — | 102 | 100 | 101 |
| Example 3 | mixer equipped with a stirrer | 2 | — | succinic acid | 35 | 38 | 36 |
| Example 4 | mixer equipped with a stirrer | 2 | — | malic aicd | 22 | 27 | 26 |
| Example 5 | mixer equipped with a stirrer | 2 | — | ethylenediaminetetraacetic acid | 10 | 15 | 14 |
| Example 6 | mixer equipped with a stirrer | 2 | — | 1,2,3-propanetricarboxylic acid | 9 | 13 | 12 |
| Example 7 | mixer equipped with a stirrer | 2 | — | citric acid | 8 | 11 | 10 |
| Example 8 | rotary dispersing machine having a meshing structure | 2 | — | succinic acid | 12 | 16 | 15 |
| Example 9 | rotary dispersing machine having a meshing structure | 2 | — | malic aicd | 0 | 1 | 1 |
| Example 10 | mixer equipped with a stirrer | 2 | hydrogen peroxide aqueous solution | succinic acid | 15 | 17 | 19 |
| Example 11 | mixer equipped with a stirrer | 2 | hydrogen peroxide aqueous solution | 1,2,3,4-butanetetracarboxylic acid | 8 | 11 | 12 |
| Example 12 | mixer equipped with a stirrer | 2 | hydrogen peroxide aqueous solution | ethylenediaminetetraacetic acid | 9 | 12 | 13 |
| Comparative Example 1 | mixer equipped with a stirrer | 2 | — | oxalic acid | 46 | 62 | 58 |
| Comparative Example 1 | rotary dispersing machine having a meshing structure | 2 | — | lactic acid | 41 | 53 | 53 |
| Comparative Example 3 | rotary dispersing machine having a meshing structure | 2* | — | glycolic acid | not separated | | |
| Comparative Example 4 | mixer equipped with a stirrer | 2 | — | bis(2-ethylhexyl) hydrogenphosphate | 47 | 76 | 67 |

*isopropanol was used in place of water. Parts by mass of isopropanol is indicated.

In all the Examples, the water phase contained lithium and/or titanium. The alcohol concentration in the mixed liquid was 500 ppm or less.

The present application is based on Japanese Patent Applications (Japanese Patent Application No. 2012-101314, Japanese Patent Application No. 2012-101315), filed on Apr. 26, 2012 to Japan Patent Office, the entire contents of which are hereby incorporated by reference.

INDUSTRIAL APPLICABILITY

The method for producing a polymer according to the present invention has the industrial applicability as a method of removing metal residues remaining in a polymer solution.

The invention claimed is:
1. A method of producing a polymer, comprising:
   step 1 of preparing a polymer solution comprising at least (i) titanium or (ii) lithium and titanium;
   step 2 of adding and mixing water in a volume 0.1 to 20 times a volume of the polymer solution and an organic acid compound of formula (1) to the polymer solution to thereby obtain a mixed liquid, wherein the mixing is carried out by using a rotary dispersing machine having a meshing structure; and step 3 of removing a water phase from the mixed liquid to thereby obtain a refined polymer solution, wherein said formula (1) is represented by

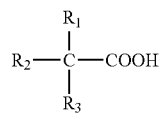

(1)

wherein each of $R_1$, $R_2$ and $R_3$ independently consists of a single element or a plurality of elements selected from the group consisting of C, H, O and N, and wherein the organic acid compound comprises 4 or more oxygen atoms in the molecule, and said organic acid compound of formula (1) is the only acid compound mixed with the polymer solution.

2. The method for producing the polymer according to claim 1, wherein the organic acid compound has number of a hydroxyl group (provided that —OH of a carboxyl group is excluded) of 0 or 1.

3. The method for producing the polymer according to claim 2, wherein the polymer solution further comprises aluminum.

4. The method for producing the polymer according to claim 2, wherein the organic acid compound has a total number of oxygen atoms of 5 or more.

5. The method for producing the polymer according to claim 2, wherein the organic acid compound has a total number of oxygen atoms of 7 or more.

6. The method for producing the polymer according to claim 2, wherein the organic acid compound has a total number of carbon atoms of 20 or less.

7. The method for producing the polymer according to claim 2, wherein the organic acid compound is a polyvalent carboxylic acid.

8. The method for producing the polymer according to claim 1, wherein the polymer solution further comprises aluminum.

9. The method for producing the polymer according to claim 1, wherein the organic acid compound has a total number of oxygen atoms of 5 or more.

10. The method for producing the polymer according to claim 1, wherein the organic acid compound has a total number of oxygen atoms of 7 or more.

11. The method for producing the polymer according to claim 1, wherein the organic acid compound has a total number of carbon atoms of 20 or less.

12. The method for producing the polymer according to claim 1, wherein the organic acid compound is a polyvalent carboxylic acid.

13. The method for producing the polymer according to claim 1, wherein the organic acid compound comprises 3 or more carboxyl groups.

14. The method for producing the polymer according to claim 1, wherein in the step 2, an oxidizing agent is further added and mixed.

15. The method for producing the polymer according to claim 14, wherein the oxidizing agent is hydrogen peroxide.

16. The method for producing the polymer according to claim 1, wherein each of $R_1$, $R_2$ and $R_3$ in the formula (1) independently consists of the single element or the plurality of elements selected from the group consisting of C, H and O.

17. The method for producing the polymer according to claim 1, wherein in the step 3, the water phase comprises lithium and/or titanium.

18. The method for producing the polymer according to claim 1, wherein in the step 2, the mixed liquid has an alcohol concentration of 500 ppm or less.

* * * * *